INVENTORS
LEWIS C. POUNDS
DOUGLAS F. SMITH

United States Patent Office 3,345,248
Patented Oct. 3, 1967

3,345,248
MULTILAYER DECORATIVE LAMINATES WITH A TOP SHEET COMPRISING A METHYL METHACRYLATE POLYMER
Lewis C. Pounds, Cheshire, and Douglas F. Smith, North Haven, Conn., assignors to American Cyanamid Company, New York, N.Y., a corporation of Maine
Filed Jan. 22, 1962, Ser. No. 167,961
8 Claims. (Cl. 161—248)

ABSTRACT OF THE DISCLOSURE

A unitary heat- and pressure-consolidated decorative laminated article comprising in superimposed relationship a plurality of phenolic resin impregnated fibrous sheets base member, a decorative sheet member directly bonded to the base member impregnated with an aminotriazine-aldehyde resin and a non-porous sheet of a polymer of methyl methacrylate directly bonded to said decorative sheet member.

Figure 1:
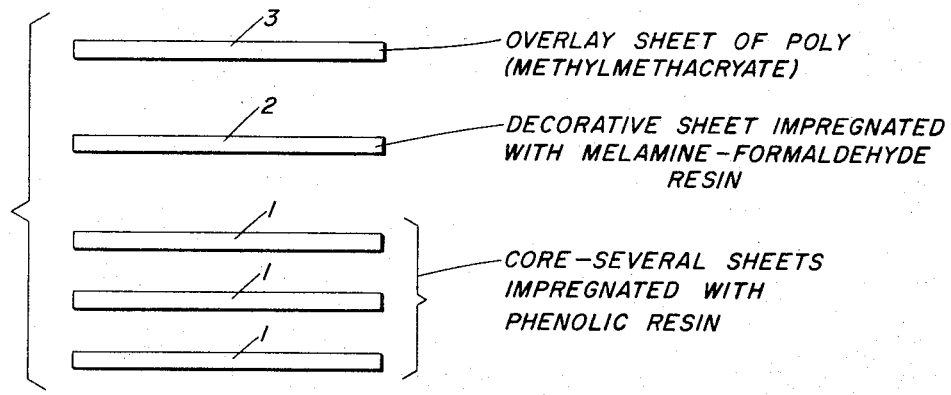

This invention relates to novel, unitary, heat- and pressure-consolidated decorative laminated articles and to methods of preparing such articles. More particularly, this invention relates to novel, heat- and pressure-consolidated, thermoset resin-bonded multilayer decorative laminates suitable for outdoor use wherein the upper decorative surface comprises a substantially non-porous sheet of a polymer of methyl methacrylate.

The many excellent properties possessed by thermoset, i.e., substantially completely cured, aminotriazine-aldehyde resins such as melamine-formaldehyde resins have led to their widespread use in many important applications. This is particularly true in the case of heat- and pressure-consolidated multilayer decorative laminates intended for indoor use either as horizontal working surfaces, such as table, counter and bar tops, or as vertical decorative surfaces, such as decorative panels, cabinet facings, and the like, where durability and good decorative appearance are prime consumer requirements.

The decorative surfaces of laminates of this type, and especially those of laminates used as horizontal working surfaces, are generally subjected to extensive wear. To lend greater durability to these surfaces without detracting from their decorative appearance it is conventional in preparing this type of laminate to employ a "translucent" overlay sheet, sometimes referred to as a protective overlay, as the uppermost structural member in the laminate.

Conventional laminates of this type generally comprise, first of all, a base or core member, which functions to impart rigidity to the laminate and which usually comprises a plurality of sheets of kraft paper impregnated throughout and bonded with a substantially completely cured phenolic resin. A print sheet member, which generally comprises a single sheet or foil of a good grade of absorbent α-cellulose or regenerated cellulose paper or similar fibrous material impregnated with a substantially completely cured aminotriazine-aldehyde resin, usually a thermoset melamine-formaldehyde resin, is directly bonded to the base member. As its name implies, the print sheet is usually printed with an ornamental design or dyed or pigmented to impart color thereto. Finally, a protective overlay, generally comprising a single sheet or foil of high grade α-cellulose paper or similar fibrous material impregnated with a substantially completely cured aminotriazine-aldehyde resin similar to or the same as that used to impregnate the print sheet member, is directly bonded to the print sheet member.

It has frequently been stated in the prior art that the aminotriazine-aldehyde resins, and more particularly the melamine-formaldehyde resins, which are conventionally used to impregnate the protective overlay are ideally suited to this function, in that their use imparts hardness, clarity and durability to the decorative surfaces of all types of high pressure thermosetting laminates. However, in the case of outdoor laminates it has been found from experience that this is only partially true, and that even laminates prepared using such overlays wherein the amount of melamine-formaldehyde resin employed is sufficient to give a resinous surface layer thick enough to protect the decorative surface of the laminate, and particularly the print sheet portion thereof, from the effects of abrasion as commonly encountered in indoor use will, nevertheless, suffer rapid deterioration on exposure to outdoor conditions, i.e., they will not only craze and crack, but they eventually will become cloudy or even completely opaque.

An explanation of the conditions which lead to this rapid deterioration involves consideration of many factors. First of all, unmodified melamine-formaldehyde resins are relatively inflexible. In addition, they have only moderate dimensional stability, particularly if they have been formed into relatively thick resinous layers, and thus various portions of the resinous surface layer associated with the overlay will undergo markedly uneven expansion and contraction. This lack of dimensional stability is believed to be associated with the free moisture content of the cured resin, with moisture generated through progressive condensation, and also with moisture from the atmosphere. It can be readily appreciated that with the passage of time and with continued exposure to heat and sunlight this free moisture will escape more readily from the thinner portions of the resinous surface layer than from the thicker portions, even if the difference in thickness between these portions is relatively slight, and every indication induces those skilled in the art to believe that when a state of moisture imbalance is eventually reached which will cause dimensional instability, the system, i.e., the relatively inflexible resinous surface layer, will adjust itself by means of cracking or crazing to relieve the built-up dimensional stresses.

At this point another factor enters the picture. Cracking and crazing of the resinous surface layer will in time expose the overlay sheet itself. Once this occurs the fibrous structure of the overlay sheet, acting as a wick, draws moisture from the atmosphere into the laminate. This produces several undesirable results. First of all, it leads to further deterioration of the resinous surface layer. It also causes deterioration of the resinous layer between the overlay and print sheets. Of primary importance, however, is the fact that it causes the overlay and, eventually, the print sheet member (since it too has a fibrous structure), to deteriorate, thus destroying the desired transparency.

Numerous attempts have been made by those skilled in the art to overcome the inherent deficiencies found in melamine resin-impregnated outdoor decorative laminates. For example, in an attempt to minimize the dimensional instability associated with relatively thick resinous surface layers, laminates of the type in question were prepared using overlays impregnated with just enough melamine-formaldehyde resin to provide a very thin resinous surface layer. It was soon found that wind-driven dust, as well as other sources of abrasion normally encountered in outdoor use, quickly exposed the overlay sheet to atmospheric moisture, leading to the same wicking action by the overlay's fibrous structure and, eventually, to cracking, crazing, cloudiness and opacity.

Another attempt to solve this problem involved the preparation of laminates containing no protective overlay sheet, wherein the decorative surface consisted solely of a layer of melamine resin on top of a print sheet. However, cured melamine-formaldehyde resin without the reinforcing effect of cellulose fibers or their equivalent is relatively inflexible, and therefore highly susceptible to crazing. As a result, laminates of this type proved to be extremely difficult to fabricate. In most cases they cracked or crazed immediately upon removal from the press, and those that did not deteriorated rapidly on exposure to outdoor conditions. Thus, the experience of the prior art has been that melamine resin-impregnated decorative laminates, either with or without protective overlays, are unsuitable for outdoor use.

We have now discovered that by replacing the aforementioned aminotriazine-aldehyde resin-impregnated protective overlay sheet with a substantially non-porous sheet of a polymer of methyl methacrylate a solution to each of the problems described hereinabove is provided. More particularly, the practice of the present invention provides novel heat- and pressure-consolidated thermoset resin-impregnated multilayer decorative laminates which may be satisfactorily employed for outdoor uses, for example as building panels, message-bearing signs and the like, and which are characterized by excellent dimensional stability and resistance to crazing, as well as by improved transparency of the overlay member, which in turn imparts a pleasing depth to the decorative surface.

It is, therefore, an object of our invention to prepare novel, unitary, heat- and pressure-consolidated, thermoset, resin-bonded multilayer decorative laminates.

It is also an object of our invention to prepare novel, unitary, heat- and pressure-consolidated thermoset resin-bonded multilayer decorative laminates suitable for outdoor use wherein the decorative surface comprises a substantially non-porous sheet of a polymer of methyl methacrylate.

These and other objects of our invention will be discussed more fully hereinbelow.

The phenolic resin-impregnated base or core members employed in preparing laminates according to the practice of the present invention do not differ from those employed in preparing conventional high pressure decorative laminates. Due to the fact that the base member usually cannot be seen when the laminate is in use, and additionally since this part of the laminate is not subjected to ordinary wear, suitable base members can be prepared using a plurality of sheets or plies of a low-cost kraft paper, creped kraft paper, or both together with the least amount of a thermosetting phenolic resin capable of providing a good bond in the core assembly, e.g., amounts of phenolic resin ranging from about 25% to about 40% by weight, based on the total weight of the impregnated paper. Ordinarily, from about 5 to about 8 sheets of phenolic resin-impregnated paper will be used to provide a base member which, in the finished laminate, will usually be at least one-sixteenth of an inch thick. Neither the number of sheets of paper, the amount of phenolic resin, nor the thickness ultimately achieved in the base member are critical. However, it has been found that a base member of at least one-sixteenth of an inch in thickness is especially suitable when the finished laminate is bonded to solid or precured substrates, such as plastic laminates, e.g., glass fiber-reinforced thermoset polyester resin laminates, wood products, e.g., hardboard, woodwaste or particle boards, plywood, and the like, or mineral base boards, e.g., asbestos-cement board, sheet rock, plaster board, and the like, in that a base member having at least this minimum thickness is better able to relieve or take up stresses produced by these relatively dimensionally unstable substrates, thereby preventing such stresses from causing cracking or crazing on the decorative surface of the laminate.

The thermosetting phenolic resins used to impregnate the base or core member are well known in the art as shown, for example, in U.S. Patents Nos. 2,205,427; 2,315,087 and 2,328,592, among others, and are conventionally obtained by reacting a phenolic substance such as phenol itself, substituted phenols, e.g., alkyl phenols such as cresols, xylenols, tertiary alkyl phenols, and the like, or mixtures of such phenolic substances with an aldehyde such as formaldehyde, acetaldehyde, propionaldehyde, benzaldehyde, furfural, and the like, or with mixtures of such aldehydes, either alone or in the presence of other aldehyde-reactable substances such as urea, thiourea, substituted ureas and thioureas, aminotriazines, e.g., melamine, lignin derivatives, and the like.

Just as in the case of the base or core member, the print sheet members employed in preparing laminates according to the practice of the present invention do not differ from those employed in preparing conventional high pressure decorative laminates. Ordinarily, a sheet or foil of absorbent $\alpha$-cellulose or regenerated cellulose paper of from about 4 to about 8 mils thick, impregnated with from about 25% to about 60% by weight, and preferably from about 35% to about 45% by weight, based on the total weight of the impregnated paper, of a thermosetting aminotriazine-aldehyde resin, will be employed. Printed designs having an unlimited range or form of artistic effects may be employed, so long as the inks or other coloring matter contained therein are non-bleeding in the aminotriazine-aldehyde resin comprising the infused resin component of the print sheet member. The print sheet also serves as a barrier sheet for the base or core member, thus masking the unattractive appearance of the core and also barring any extensive bleeding or migration of the phenolic resin from the core, thereby preventing the appearance of said resin on the decorative surface of the laminate.

The thermosetting aminotriazine-aldehyde resins used to impregnate the print sheet member, as well as techniques for their preparation, are also well known in the art, as shown for example in U.S. Patents Nos. 2,197,357 to Widmer et al. and 2,260,239 to Talbot. These conventional thermosetting aminotriazine-aldehyde resins are synthetic resins wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are employed to impregnate the print sheet, but other aminotriazines, e.g., mono-, di- and tri-substituted melamines, such as the mono-, di- and tri-methylmelamines, and the like; guanamines, such as formoguanamine, acetoguanamine, benzoguanamine, and the like, as well as mixtures of aminotriazines, may also be utilized as reactants. Similarly, formaldehyde, either as such or as an aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in the resinous reaction product is not critical, and may be within the order of from about 1:1 to about 6:1, respectively, depending on the nature of the starting materials and the characteristics desired in the final product, but it is preferred that the mol ratio of aldehyde to aminotriazine be within the order of from about 1.5:1 to about 3:1, respectively.

Conventional reaction conditions are observed in preparing the thermosetting aminotriazine-aldehyde resin. Thus, the aldehyde and aminotriazine may be heat-reacted at temperatures ranging from about 40° C. to reflux temperature, i.e., about 100° C., for periods of time ranging from about 30 to about 120 minutes, at a pH ranging from about 7 to about 10, preferably in aqueous medium. Any substance yielding an alkaline aqueous solution may be used to effect alkaline reaction conditions, for example, alkali metal or alkaline earth metal oxides, hydroxides or salts with weak acids, e.g., sodium, potassium or calcium hydroxide or sodium or potassium carbonate. Mono-, di- or triamines, e.g., triethanolamine, alkaline polyamines or polyalkaline polyamines, e.g., 3,3'-iminobispropylamine and the like, may also be used to effect alkaline reaction conditions. When necessary, acidic substances such as hydrochloric acid, sulfuric acid, phosphoric acid, acetic acid, or salts thereof may also be employed to regulate the pH.

If desired, the thermosetting aminotriazine-aldehyde resin may be modified by the addition thereto of plasticizers such as α-alkyl-D-glucosides, e.g., α-methyl-D-glucoside, as disclosed in U.S. Patent No. 2,773,848 to Lindenfelser, methylol derivatives of sulfonamides, e.g., N-methylol-p-toluenesulfonamide (which may be formed in situ by the addition of p-toluenesulfonamide to the aminotriazine-aldehyde reaction mixture), or combinations of these glucosides and methylol sulfonamides, as disclosed in U.S. Patent No. 2,773,788 to Magrane et al. In addition, the thermosetting aminotriazine-aldehyde resin may also contain commonly employed curing catalysts, such as phosphoric acid, phthalic acid, p-toluenesulfonic acid, mixtures of alkyl alkylol tertiary amines, e.g., diethylethanolamine, and acids, e.g., acetic acid, and the like, although in most cases uncatalyzed resin will be preferred.

The techniques used in fabricating the substantially non-porous sheet of a polymer of methyl methacrylate employed as the overlay member in our novel laminates, e.g., flat extrusion, blown tubular extrusion, casting, and the like, are so well known in the art that it is not deemed necessary to describe them here at any great length. A detailed treatment of such techniques may be found in the "Plastics Engineering Handbook of the Society of the Plastics Industry, Inc." (New York: Reinhold Publishing Corporation; 3rd. edition—1960) at pages 81–90 and 198 to 205.

The methyl methacrylate polymer employed is preferably a homopolymer of methyl methacrylate. However, copolymers of methyl methacrylate with up to about 30% by weight, and preferably from about 5% to about 20% by weight, based on the total weight of the copolymer, of one or more ethylenically unsaturated monomers copolymerizable therewith can also be employed, particularly where it is desired to modify the physical properties of the polymeric sheet, e.g., to impart even greater heat-resistance or solvent resistance thereto. A plurality of such comonomers are known in the prior art, included among which are styrene, side chain-substituted styrenes, e.g., α-methylstyrene, α-ethylstyrene, and the like, ring-substituted styrenes, e.g., o-methylstyrene, p-ethylstyrene, and the like, other methacrylic acid esters, e.g., ethyl methacrylate, propyl methacrylate, butyl methacrylate, and the like, acrylonitrile, methacrylonitrile, acrylamide, and the like. In addition, alkyl acrylates, e.g., methyl acrylate, ethyl acrylate, butyl acrylate, and the like may be employed as comonomers to impart a beneficial degree of internal plasticization to the methyl methacrylate polymer.

Whether a homopolymer or a copolymer of methyl methacrylate is used to prepare the polymeric sheet, its molecular weight will range from about 60,000 to about 250,000, and preferably from about 80,000 to about 150,000, as determined by intrinsic viscosity measurements [see Flory, "Principles of Polymer Chemistry" (Ithaca, N.Y.: Cornell University Press, 1953), pages 308 to 311], inasmuch as sheets prepared from polymers having molecular weights substantially lower than 60,000 will generally be deficient in one or more necessary physical properties, e.g., heat- or solvent-resistance, while sheets prepared from polymers having molecular weights substantially greater than 250,000 can generally be incorporated into the laminate structure only by using temperatures and pressures which would be harmful to the remainder of said structure.

Besides internal plasticizers such as the alkyl acrylates, other well known plasticizers, such as dibutyl phthalate, dioctyl phthalate, low molecular weight polyethylene glycols, and the like, or lubricants, such as stearyl alcohol and the like, may be incorporated into the methyl methacrylate polymer. The amount of plasticizer or lubricant employed may range up to about 10% by weight, based on the total weight of the plasticized or lubricated polymer.

Substantially non-porous sheets of a polymer of methyl methacrylate which range in thickness from about 5 mils to about 30 mils, and preferably from about 7 mils to about 10 mils, will be employed in practicing the present invention. It is not necessary that the polymeric sheet be entirely free of minor flaws such as bubbles, extrusion marks, and the like, inasmuch as such flaws will be pressed out of the sheet during the laminating operation. If desired, the polymeric sheet may be biaxially or multiaxially stretched (stress-oriented) in the manner known in the prior art before being assembled with the remaining members of the laminating assembly to further improve certain of its physical properties, e.g., to further improve its craze-resistance and solvent resistance.

Conventional laminating techniques are employed in preparing our novel laminates. The print sheet and the sheets constituting the base or core member are first impregnated with solutions or dispersions of the respective resins using such methods as dipping, roll coating, spraying, or the like. Once these sheets have been impregnated, they are dried at elevated temperatures, using a forced hot air drying oven, infrared heating means, or the like, to a desired volatile content, e.g., in the case of the print sheet, to a volatile content in the range of from about 2% to about 8% by weight, and preferably from about 3% to about 6% by weight, and in the case of the sheets constituting the core member, to a volatile content in the range of from about 4% to about 12% by weight, and preferably from about 6% to about 10% by weight, each of said volatile contents being based on the total weight of the respective dried, impregnated sheets. The print sheet member and the base or core sheets are then assembled, together with the substantially non-porous sheet of a polymer of methyl methacrylate, between laminating press plates, e.g., stainless steel press plates which may have finishes ranging from a mirror polish to a matt surface, then inserted in a laminating press, either as a single assembly or as a multiple assembly of two or more such structures, and consolidated by means of heat and pressure into a unitary decorative structure. Besides laminates made up of a single substantially non-porous polymethyl methacrylate sheet directly bonded to a print sheet member which is in turn directly bonded to a base or core member, balanced laminates consisting of print sheet and overlay members bonded to each side of the base or core member may also be prepared.

Temperatures ranging from about 130° C. to about 160° C., preferably from about 135° C. to about 150° C., and pressures ranging from about 300 p.s.i. to about 1500 p.s.i., preferably from about 800 p.s.i. to about 1400 p.s.i., will be employed. The time required to effect substantially complete cure of the thermosetting resinous components of the print sheet and base or core members and to bond the substantially non-porous polymeric sheet to the print sheet member when employing temperatures and pressures within the above-stated ranges will usually be from about 15 minutes to about 25 minutes. The resulting laminate is allowed to cool to at least the heat distortion temperature of its substantially non-porous overlay member, and preferably to a temperature of less than about 50° C., before being removed from the press.

Figure 2:
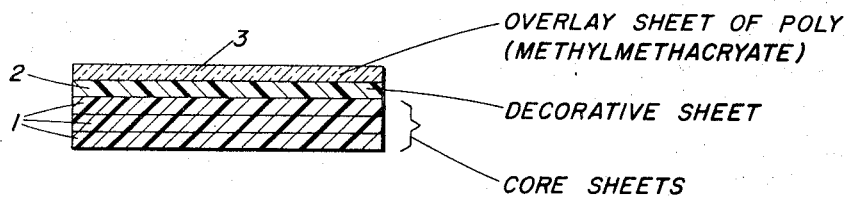

Reference is made to the accompanying drawing in which FIGURE 1 shows a plurality of core sheets impregnated with a phenolic resin. These core sheets are identified as 1. Superimposed above the core sheets is positioned a decorative sheet impregnated with a melamine-formaldehyde resin. The decorative sheet is identified as 2. Superimposed above the melamine-formaldehyde resin impregnated decorative sheet is an overlay sheet of poly(methyl methacrylate). The overlay sheet is identified as 3. FIGURE 2 shows the ultimate laminate as claimed in which the superimposed assembly of FIGURE 1 is heat- and pressure-consolidated to a unitary structure providing the core sheets 1, the decorative sheet 2, and the overlay sheet of poly(methyl methacrylate) 3.

In order that those skilled in the art may more fully understand the inventive concept presented herein, the following examples are set forth. These examples are given solely by way of illustration, and should not be considered as expressing limitations unless so set forth in the appended claims. All parts and percentages are by weight, unless otherwise stated.

*Example I*

The required amount of commercially available spray-dried melamine-formaldehyde resin (mol ratio formaldehyde:melamine=2:1, respectively) was dissolved in a mixture of 95% water and 5% isopropanol to give a resin syrup having a resin solids content of 50%.

A sheet of commercially available α-cellulose print paper, 5 mils thick, printed with a wood print design, was dipped in the melamine-formaldehyde resin syrup, impregnated to a resin content of 42%, and then oven-dried to a volatile content of 4.3%.

A laminating assembly was then prepared by first placing the dried, impregnated print sheet on top of a base member consisting of five sheets of standard phenolic resin-impregnated core stock, each sheet being 10 mils thick and having a resin content of 30%, a volatile content of 7.7% and a flow of 4.6%. Next, a substantially non-porous sheet of polymethyl methacrylate, 5 mils thick, flat extruded from Diakon LO polymethyl methacrylate (average molecular weight approximately 100,000), was placed over the print sheet. The entire assembly was then positioned between a pair of stainless steel press plates having a mirror or polish finish and laminated at a temperature of 140° C. under a pressure of 1100 p.s.i. for 15 minutes. The resulting laminate, after being allowed to cool to room temperature, was removed from the press. It had a smooth, glossy decorative surface.

*Example II*

The procedure given in Example I above was repeated in every detail but one. The bottom two sheets of the core member were replaced by two sheets of standard phenolic resin-impregnated creped kraft paper core stock, each 8 mils thick and each having a resin content of about 35%, a volatile content of 6.8% and a flow of 15.8%. The laminate obtained also had a smooth, glossy decorative surface.

*Example III*

The required amount of a spray-dried melamine-formaldehyde resin (mol ratio formaldehyde:melamine= 1.7:1, respectively) containing 8% of toluenesulfonamide (weight ratio ortho:para=40:60, respectively), 7% of α-methyl-D-glucoside and 0.3% of 3,3'-iminobispropylamine, all percentages being based on total resin solids, was dissolved in a mixture of 95% water and 5% isopropanol to give a resin syrup having a resin solids content of 50%.

An unimpregnated print sheet identical to that described in Example I was dipped in the melamine-formaldehyde resin syrup, impregnated to a resin content of 42.1%, and then oven-dried to a volatile content of 3.8%. The dried, impregnated print sheet was then placed on top of a base member consisting of five sheets of standard phenolic resin-impregnated core stock identical to those described in Example I. Next, a substantially non-porous sheet of polymethyl methacrylate, 20 mils thick, flat extruded from Diakon LO polymethyl methacrylate, was placed over the print sheet. The entire assembly was then positioned between a pair of stainless steel press plates having a mirror polish finish and laminated at a temperature of 150° C. under a pressure of 1100 p.s.i. for 15 minutes. The resulting laminate was allowed to cool to room temperature before being removed from the press. It had a smooth, glossy decorative surface. Furthermore, its decorative surface exhibited no visible defects after being exposed to accelerated weathering conditions for 2000 hours in a model DMC–R Atlas Weather-O-Meter (twin enclosed carbon arc lamp) operated according to ASTM Standard D 1499–59T for a carbon arc instrument.

*Example IV*

The procedure given in Example III was repeated in every detail but one. The base member employed in Example III was replaced by a base member as described in Example II, i.e., three sheets of standard phenolic resin-impregnated kraft paper core stock over two sheets of standard phenolic resin-impregnated creped kraft paper core stock. The laminate obtained also had a smooth, glossy decorative surface which exhibited no visible defects after 2000 hours exposure to accelerated weathering conditions in the Weather-O-Meter.

*Example V*

A laminate was prepared as described in Example IV with the exception that the 20 mil thick substantially non-porous flat extruded polymethyl methacrylate sheet was replaced by a 5 mil thick substantially non-porous sheet of the same material. The laminate obtained had a smooth glossy decorative surface which exhibited no visible defects after 1000 hours exposure to accelerated weathering conditions in the Weather-O-Meter.

*Example VI*

The required amount of a spray-dried melamine-formaldehyde resin (mol ratio formaldehyde:melamine=2:1, respectively) containing 8% of toluenesulfonamide (weight ratio ortho:para=40:60, respectively) and 7% of α-methyl-D-glucoside, said percentages being based on total resin solids, was dissolved in a mixture of 95% water and 5% isopropanol to give a resin syrup having a resin solids content of 62.5%.

This resin syrup was used to impregnate a 5 mil thick sheet of commercially available print paper bearing a wood print design to a resin content of 44%. The impregnated print sheet was then oven-dried to a volatile content of 4.6%. The dried, impregnated print sheet was then placed on top of a base member as described in Example II, i.e., three sheets of standard phenolic resin-impregnated kraft paper core stock over two sheets of standard phenolic resin-impregnated creped kraft paper core stock. A 5 mil thick substantially non-porous polymethyl methacrylate sheet, flat extruded from Diakon LO polymethyl methacrylate, was placed over the print sheet and the entire assembly then positioned between two stainless steel press plates having a matt finish and laminated in a laminating press at a temperature of 150° C. under a pressure of 1500 p.s.i. for 15 minutes. The resulting laminate had a pleasing matt finished decorative surface which exhibited no visible change in appearance after 1000 hours in the Weather-O-Meter.

*Example VII*

The procedure given in Example VI was repeated with the following exceptions. The resin used to impregnate the print sheet was prepared by dissolving the required amount of a spray dried melamine-formaldehyde resin (mol ratio formaldehyde:melamine=2:1, respectively) containing 8% of toluenesulfonamide (weight ratio ortho:para=40:60, respectively), 7% of α-methyl-D-glucoside and 0.3% of 3,3'-iminobispropylamine, all percentages being based on total resin solids, in a mixture of 95% water and 5% isopropanol to give a resin syrup having a resin solids content of 50%. The print sheet was impregnated to a resin content of 44.2% and oven-dried to a volatile content of 4.3%. The laminate obtained had a pleasing matt finished decorative surface which exhibited no visible change in appearance after 1000 hours exposure to accelerated weathering conditions in the Weather-O-Meter.

*Example VIII*

Two 5 mil thick commercially available print sheet papers bearing the same wood print design were each impregnated with 44% of the resin syrup described in Example VI and then oven-dried to a volatile content of 4.6%. The dried, impregnated print sheets were then placed on opposite sides of a base member consisting of six sheets of standard phenolic resin-impregnated core stock identical to those described in Example I. Next, a 16 mil thick substantially non-porous sheet of polymethyl methacrylate, flat extruded from Diakon LO polymethyl methacrylate, was placed over each print sheet. The assembly was then laminated in a laminating press between stainless steel plates having a mirror polish finish at a temperature of 150° C. under a pressure of 1100 p.s.i. for 15 minutes. The resulting laminate was allowed to cool to room temperature before being removed from the press. Each decorative surface was smooth and glossy and exhibited no visible defects after 1000 hours exposure to accelerated weathering conditions in the Weather-O-Meter.

*Example IX*

The procedure given in Example VIII was repeated with the following exceptions. The print sheets were each impregnated with the resin syrup described in Example VII to a resin content of 29.3% and then oven-dried to a volatile content of 7.7%. The 16 mil thick flat extruded substantially non-porous sheet of polymethyl methacrylate was replaced by a 20 mil thick sheet of the same material. The laminate obtained also had two smooth, glossy decorative surfaces which exhibited no visible change in appearance after 1000 hours exposure to accelerated weathering conditions in the Weather-O-Meter.

*Example X*

The procedure given in Example VIII was again repeated with the following exceptions. The print sheets were each impregnated with the resin syrup described in Example III, to which there had been added 2.2%, based on total resin solids, of a mixture of diethylethanolamine and acetic acid (mol ratio diethylethanolamine:acetic acid=1.02:1, respectively), to a resin content of 59.5% and then dried to a volatile content of 5.3%. The 16 mil thick flat extruded substantially non-porous sheet of polymethyl methacrylate was replaced by a 17 mil thick sheet of the same material. The laminate obtained was similar in appearance to those of Examples VIII and IX and, like these laminates, its decorative surfaces exhibited no visible change in appearance after 1000 hours exposure to accelerated weathering conditions in the Weather-O-Meter.

It will be obvious to those skilled in the art that other changes and variations may be made in carrying out the present invention without departing from the spirit and scope thereof as defined in the appended claims.

We claim:
1. A unitary, heat- and pressure-consolidated decorative laminated article suitable for outdoor use which comprises a superimposed assembly of:
 (1) a rigidity-imparting base member comprising a plurality of fibrous sheets impregnated with a substantially completely cured phenolic resin,
 (2) a decorative sheet member directly bonded to said base member comprising a fibrous sheet impregnated with a substantially completely cured aminotriazine-aldehyde resin, and
 (3) a substantially non-porous sheet, of from about 5 mils to about 30 mils in thickness, of a polymer of methyl methacrylate having a molecular weight of from about 60,000 to about 250,000 selected from the group consisting of homopolymers of methyl methacrylate and copolymers of methyl methacrylate with up to about 30% by weight based on the total weight of the copolymer of a different ethylenically unsaturated monomer copolymerizable therewith directly bonded to said decorative sheet member.

2. A unitary, heat- and pressure-consolidated decorative laminated article suitable for outdoor use which comprises a superimposed assembly of:
 (1) a rigidity-imparting base member comprising a plurality of fibrous sheets impregnated with a substantially completely cured phenolic resin,
 (2) a decorative sheet member directly bonded to said base member comprising a fibrous sheet impregnated with a substantially completely cured aminotriazine-aldehyde resin, and
 (3) a substantially non-porous sheet, of from about 5 mils to about 30 mils in thickness, of a polymer of methyl methacrylate having a molecular weight of from about 80,000 to about 150,000 selected from the group consisting of homopolymers of methyl methacrylate and copolymers of methyl methacrylate with up to about 30% by weight based on the total weight of the copolymer of a different ethylenically unsaturated monomer copolymerizable therewith directly bonded to said decorative sheet member.

3. A unitary, heat- and pressure-consolidated decorative laminated article suitable for outdoor use which comprises a superimposed assembly of:
 (1) a rigidity-imparting base member comprising a plurality of fibrous sheets impregnated with a substantially completely cured phenolic resin,
 (2) a decorative sheet member directly bonded to said base member comprising a fibrous sheet impregnated with a substantially completely cured aminotriazine-aldehyde resin, and
 (3) a substantially non-porous sheet, of from about 5 mils to about 30 mils in thickness, of polymethyl methacrylate having a molecular weight of from about 60,000 to about 250,000 directly bonded to said decorative sheet member.

4. A unitary, heat- and pressure-consolidated decorative laminated article suitable for outdoor use which comprises a superimposed assembly of:
 (1) a rigidity-imparting base member comprising a plurality of fibrous sheets impregnated with a substantially completely cured phenolic resin,
 (2) a decorative sheet member directly bonded to said base member comprising a fibrous sheet impregnated with a substantially completely cured aminotriazine-aldehyde resin, and
 (3) a substantially non-porous sheet, of from about 5 mils to about 30 mils in thickness, of polymethyl methacrylate having a molecular weight of from about 80,000 to about 150,000 directly bonded to said decorative sheet member.

5. A unitary, heat- and pressure-consolidated decorative laminated article suitable for outdoor use which comprises a superimposed assembly of:
   (1) a rigidity-imparting base member comprising a plurality of fibrous sheets impregnated with a substantially completely cured phenolic resin,
   (2) a decorative sheet member directly bonded to said base member comprising a fibrous sheet impregnated with a substantially completely cured melamine-formaldehyde resin, and
   (3) a substantially non-porous sheet, of from about 5 mils to about 30 mils in thickness, of a polymer of methyl methacrylate having a molecular weight of from about 60,000 to about 250,000 selected from the group consisting of homopolymers of methyl methacrylate and copolymers of methyl methacrylate with up to about 30% by weight based on the total weight of the copolymer of a different ethylenically unsaturated monomer copolymerizable therewith directly bonded to said decorative sheet member.

6. A unitary, heat- and pressure-consolidated decorative laminated article suitable for outdoor use which comprises a superimposed assembly of:
   (1) a rigidity-imparting base member comprising a plurality of fibrous sheets impregnated with a substantially completely cured phenolic resin,
   (2) a decorative sheet member directly bonded to said base member comprising a fibrous sheet impregnated with a substantially completely cured melamine-formaldehyde resin, and
   (3) a substantially non-porous sheet, of from about 5 mils to about 30 mils in thickness, of a polymer of methyl methacrylate having a molecular weight of from about 80,000 to about 150,000 selected from the group consisting of homopolymers of methyl methacrylate and copolymers of methyl methacrylate with up to about 30% by weight based on the total weight of the copolymer of a different ethylenically unsaturated monomer copolymerizable therewith directly bonded to said decorative sheet member.

7. A unitary, heat- and pressure-consolidated decorative laminated article suitable for outdoor use which comprises a superimposed assembly of:
   (1) a rigidity-imparting base member comprising a plurality of fibrous sheets impregnated with a substantially completely cured phenolic resin,
   (2) a decorative sheet member directly bonded to said base member comprising a fibrous sheet impregnated with a substantially completely cured melamine-formaldehyde resin, and
   (3) a substantially non-porous sheet, of from about 5 mils to about 30 mils in thickness, of polymethyl methacrylate having a molecular weight of from about 60,000 to about 250,000 directly bonded to said decorative sheet member.

8. A unitary, heat- and pressure-consolidated decorative laminated article suitable for outdoor use which comprises a superimposed assembly of:
   (1) a rigidity-imparting base member comprising a plurality of fibrous sheets impregnated with a substantially completely cured phenolic resin,
   (2) a decorative sheet member directly bonded to said base member comprising a fibrous sheet impregnated with a substantially completely cured melamine-formaldehyde resin, and
   (3) a substantially non-porous sheet, of from about 5 mils to about 30 mils in thickness, of polymethyl methacrylate having a molecular weight of from about 80,000 to about 150,000 directly bonded to said decorative sheet member.

References Cited

UNITED STATES PATENTS

| | | | |
|---|---|---|---|
| 2,444,059 | 6/1948 | Neher et al. | 161—254 |
| 2,796,362 | 6/1957 | Wooding et al. | |
| 2,801,198 | 7/1957 | Morris et al. | 161—258 |
| 3,006,799 | 10/1961 | Adams et al. | 156—283 |

JACOB H. STEINBERG, *Primary Examiner.*

E. M. BERGERT, MORRIS SUSSMAN, *Examiners.*

H. L. GATEWOOD, R. J. ROCHE, *Assistant Examiners.*